April 28, 1925.
A. T. POTTER
1,535,250
WINDSHIELD
Filed Nov. 20, 1922  2 Sheets-Sheet 1
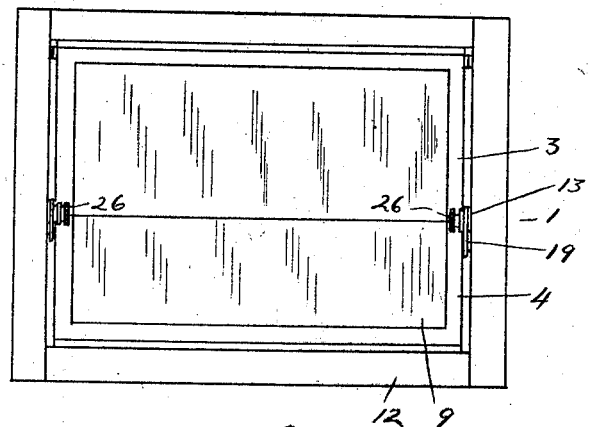
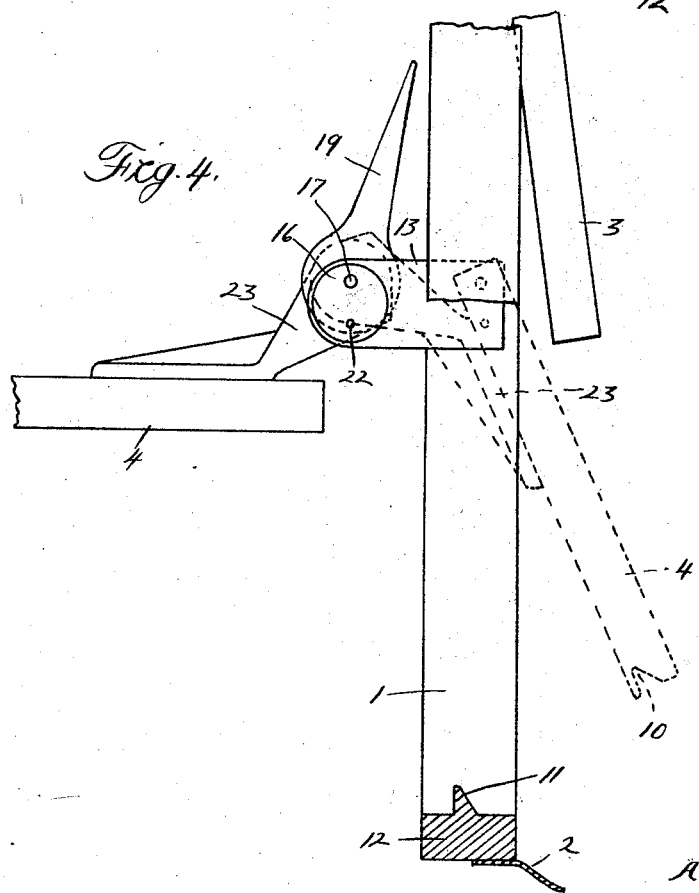
Inventor
Albert T. Potter
Attorneys April 28, 1925.
A. T. POTTER
WINDSHIELD
Filed Nov. 20, 1922   2 Sheets-Sheet 2
1,535,250
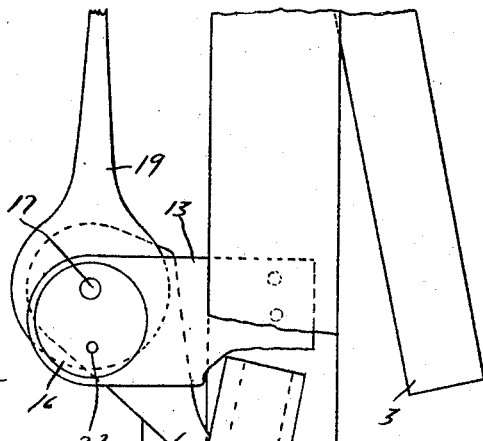
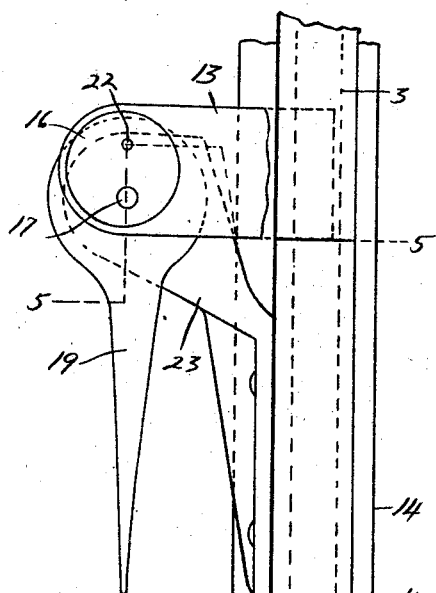
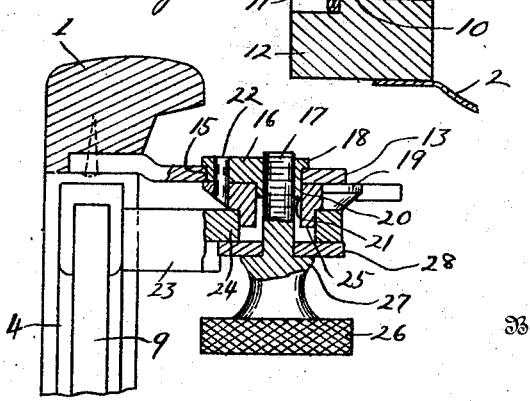
Inventor
Albert T. Potter
Attorneys Patented Apr. 28, 1925.

1,535,250

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD.

Application filed November 20, 1922. Serial No. 602,079.

*To all whom it may concern:*

Be it known that I, ALBERT T. POTTER, a citizen of the United States of America, residing at Detroit, in the county of Wayne and State of Michigan, have invented certain new and useful Improvements in Windshields, of which the following is a specification, reference being had therein to the accompanying drawings.

This invention relates to windshields and refers particularly to the type adapted for use in connection with base weather strips or fences upon windshield frames in motor vehicle constructions.

An object of the invention is to provide a strong and durable windshield having a section which is adapted to be either raised or lowered, or swung forwardly or rearwardly with respect to the base weather strip or fence.

Another object is to provide a simple and effective means for quickly raising or lowering one of the sections of the windshield.

Another object is to provide reliable and efficient means for positively retaining one of the sections of the windshield in any adjusted position.

Another object is to provide a windshield mounting which is simple in construction and which may be readily and quickly taken apart or assembled.

With the above and other objects in view the invention consists in certain novel features of construction, combination and arrangement of parts, as will be more fully described and particularly pointed out in the appended claims.

In the accompanying drawings:

Figure 1 is a front elevation of a windshield mounted in a frame upon the dash board of a motor vehicle;

Figure 2 is a side elevation of a windshield construction embodying my invention and showing parts in section;

Figure 3 is a view similar to Figure 2 but showing the upper section of the windshield in an inclined position and showing the lower section of the windshield in raised position and inclined inwardly;

Figure 4 is a view similar to Figure 2 but showing the lower section of the windshield in full lines raised to substantially horizontal position and extending rearwardly of the frame and showing the lower section in dotted lines raised to substantially horizontal position and extending forwardly of the frame;

Figure 5 is a sectional view taken on line 5—5 of Figure 2.

In motor vehicle constructions and particularly in closed body constructions, it is usual to provide some form of weather strip or fence as it is called, at the base or lower bar of the windshield frame for interlocking engagement with the frame of the lower windshield section so that a weather-tight fit may be had when the lower section of the windshield is closed. However, in such constructions it is necessary that the lower windshield section be raised to clear the weather strip or fence when it is desired to swing the section upon its pivot, and it has been found that the ordinary pivot mounting for windshield sections cannot be used in this connection.

Referring now to the drawings in which like characters of reference designate corresponding parts throughout the several views, the numeral 1 designates a frame, of any suitable material, mounted upon the dash board 2 of a motor vehicle and surrounding a pair of windshield sections 3 and 4 respectively.

The frame 5 of the lower windshield section, preferably comprises a plurality of hollow metallic rails 6. The lower rail 7 is provided at one edge with a channel 8, preferably U-shape in cross-section, which receives the glass or transparent element 9, while the opposite edge of the rail 7 is provided with a relatively deep groove 10, preferably wedge-shape in cross-section, which is adapted to receive the weather strip or fence 11 upon the base or lower bar 12 of the frame 1. The rails 6 are preferably constructed from sheet metal so that it is apparent that the walls of the grooves 10 are adapted to yield to a certain extent when placed in engagement with the fence. Consequently, a weather-tight fit is assured when the lower section 4 of the windshield is disposed in a vertical plane in its normal closed position. Moreover, the rail 7 and fence 11 are adapted to engage so tightly that there is absolutely no rattle whatever when the lower section of the windshield is placed in its normal closed position.

Two mountings are preferably employed for supporting the lower windshield section and are preferably of the same construction. In detail, relatively thin brackets 13 are detachably secured to the side bars or standards 14 of the frame 1 and extend rearwardly therefrom. The brackets 13 are provided with aligned openings 15 which receive eccentrics 16 threaded upon a pair of studs 17. The eccentrics are preferably provided with peripheral flanges 18 for engagement with one side of the brackets 13 while handle members 19 engage the opposite side of the brackets 13 and are provided with transverse openings 20 which receive annular projections 21 extending laterally from the eccentrics 16 and threaded upon studs 17. Pins 22 project laterally from the eccentrics and engage openings in the handle members to prevent any independent turning movement of the eccentrics relative to the handle members. A pair of brackets 23 are detachably secured to one side of the lower windshield section 4 adjacent to the top thereof and are provided with relatively thin rearwardly extending ears 24 which engage the handle members 19 and which are pivotally mounted upon pivots 25 that extend laterally from the handle members and surround the studs 17. The pivots 25 are co-axially arranged with respect to the studs so that upon movement of the handle members 19 in a direction indicated by the arrow in Figure 2, the eccentrics are rotated in the brackets 13 and will move the studs 17 upwardly in the arc of a circle and will cause the lower section 4 of the windshield to be raised so that the lower rail 7 thereof becomes disengaged entirely from the fence 11.

When the rail 7 has been disengaged from the fence, the lower section 4 of the windshield is then moved by gravity to an inclined position similar to that illustrated in Figure 3 whereupon the operator may readily move the same to any angular position desired either rearwardly of the frame or forwardly thereof.

Hand wheels 26, preferably knurled as shown, are formed integral with the studs 17 at one end thereof and are provided with annular shoulders 27 which are adapted to engage metallic washers 28 surrounding the studs 17 and engaging the ears 24. Very slight rotation of the wheels 26 is required to clamp firmly the brackets 23, handle members 19, brackets 13, and eccentrics 16 together.

In use, the upper section 3 of the windshield is swung upon its pivot (not shown) to the position illustrated in Figure 3 whereupon the lower section 4 of the windshield may be raised by loosening both the wheels 26 and moving either or both of the handle members 19 upwardly as indicated by the arrow in Figure 2. The lower section 4 will then be moved by gravity to an inclined position such as illustrated in Figure 3 whereupon the operator will be able to move the lower section to the desired angular position and may retain the lower section 4 in that position by rotating one or both of the wheels 26 in the opposite direction.

When the lower section 4 is disposed in an angular position the handle members 19 may be in either lowered or raised position, consequently, the lower section will be either lowered or raised in the annular position of adjustment and may be retained in that position by operation of either or both of the wheels 26. In fact, operation of either of the wheels 26 in one direction will cause the lower section 4 of the windshield to remain in any desired position of pivoted or vertical adjustment. Each mounting may be readily taken apart by merely unscrewing the stud from the eccentrics and withdrawing the pivot 25 from the ear 24 of the brackets 23 and withdrawing the pin 22 and projection 21 of the eccentric from the openings in the handle member.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a frame and a fence, of brackets carried by said frame, eccentrics rotatably mounted in said brackets, a windshield disposed within said frame and having a section normally engaging said fence, said section being carried by said eccentrics, means for rotating said eccentrics to raise said section clear of said fence, said section being adapted to be moved to an angular position with respect to said fence, and means carried by said eccentrics for retaining said section in adjusted position.

2. The combination with a frame and a fence, of brackets carried by said frame, eccentrics rotatably mounted in said brackets, a windshield disposed within said frame and having a section normally engaging said fence, pivots connected to said eccentrics, said section being mounted upon said pivots, means for rotating said eccentrics to raise said section clear of said fence, said section being adapted to be moved to an angular position with respect to said fence, and means carried by said eccentrics for retaining said section in adjusted position.

3. The combination with a standard and a fence, of a bracket carried by said standard, a threaded stud, an eccentric threaded on said stud and rotatably mounted in the bracket, a handle member having a portion surrounding said stud, a pivot carried by said handle member, a windshield having a section normally in engagement with said fence, a bracket secured to said section and having a portion mounted on said pivot, said handle member being adapted to rotate said eccentric to raise or lower said section, and a wheel carried by said stud for rotating the same to clamp said brackets, eccentric, and handle member together to retain said section in adjusted position.

4. The combination with a standard and a fence, of a bracket carried by said standard, a threaded stud, an eccentric threaded onto said stud and rotatably mounted in the bracket, a peripheral flange upon said eccentric engaging one side of said bracket, a handle member having a portion surrounding said stud and engaging the other side of said bracket, a pivot carried by the handle member, a windshield having a section normally in engagement with said fence, said handle member being adapted to rotate said eccentric to raise or lower said section, a bracket secured to said section and having a portion mounted on said pivot and a wheel carried by said stud for rotating the same to clamp said brackets, eccentric, and handle member together to retain said section in adjusted position.

5. The combination with a standard and a fence, of a bracket carried by said standard, a threaded stud, an eccentric threaded upon said stud and rotatably mounted in said bracket, a handle member having a portion surrounding said stud, projections upon said eccentric engaging said handle member, a pivot carried by said handle member, said pivot being co-axially arranged with respect to said stud, a windshield having a section normally in engagement with said fence, a bracket secured to said section and having a portion mounted on said pivot, said handle member being adapted to rotate said eccentric to raise or lower said section, and a wheel carried by said stud for rotating the same to clamp said brackets, eccentric and handle member together to retain said section in adjusted position.

6. The combination with a standard, and a fence, of a bracket carried by said standard a threaded stud, an eccentric threaded onto said stud and rotatably mounted in said bracket, a handle member having a portion surrounding said stud, a pivot carried by said handle member, a windshield having a section normally in engagement with said fence, a bracket secured to said section and having a portion engaging said handle member and mounted on said pivot, a washer engaging said bracket and surrounding said stud, said handle member being adapted to rotate said eccentric to raise or lower said section, and a wheel carried by said stud for rotating the same to clamp said bracket, eccentrics, washer and handle member together to retain said section in adjusted position.

7. The combination with a standard, of a bracket supported upon the standard and having an opening therein, a windshield, a bracket secured to said windshield, a pivot for the windshield rotatably mounted in the last-mentioned bracket, an eccentric non-rotatively secured to the pivot and rotatably mounted in the opening in the first-mentioned bracket, and means for actuating said eccentric to move said windshield.

8. The combination with a standard and a fence, of a windshield having a recess for receiving the fence, a bracket secured to the standard, a bracket secured to the windshield, a pivot member carried by the last-mentioned bracket, an eccentric secured to said pivot member and rotatably carried by the first-mentioned bracket, and means connected to the pivot for actuating the windshield for disengaging the recess from the fence.

9. The combination with a standard and a fence, of a windshield normally engaging the fence, a bracket secured to the standard, a bracket secured to the windshield, a pivot member rotatably mounted in the last-mentioned bracket, an eccentric secured to said pivot member and rotatably mounted in the first-mentioned bracket, an actuating handle connected to said pivot member, and means for clamping said brackets, pivot member and eccentric together to retain said windshield in adjusted position.

10. The combination with a standard and a fence, of a windshield normally engaging the fence, a bracket secured to the standard, an eccentric rotatably mounted in the bracket, a handle connected to the eccentric, a bracket secured to the windshield, a pivot member projecting laterally from the handle and rotatably mounted in the last-mentioned bracket, and means engaging said eccentric and one of said brackets for clamping said windshield in adjusted position.

In testimony whereof I affix my signature.

ALBERT T. POTTER.